T. M. U. VON POST.
CARBONIZING FURNACE.
APPLICATION FILED OCT. 16, 1919.
1,375,944.
Patented Apr. 26, 1921.
2 SHEETS—SHEET 1.
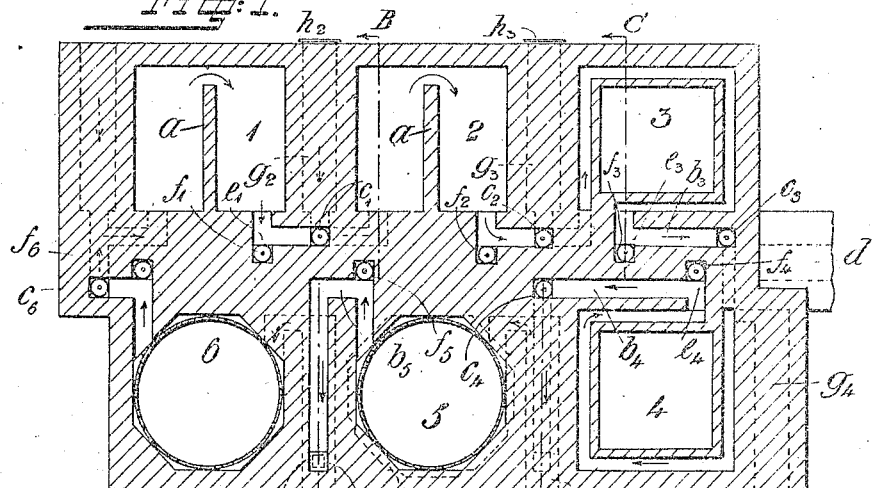
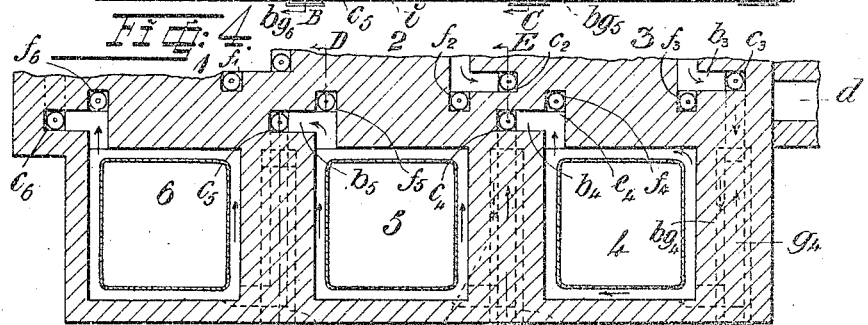
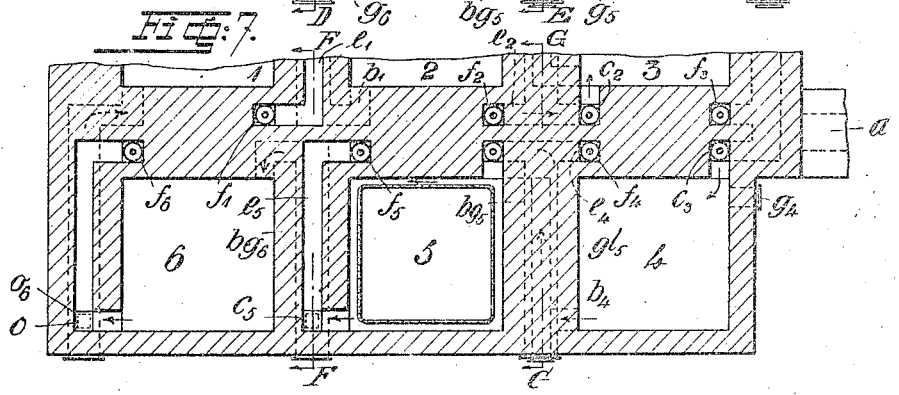
INVENTOR:
Thom Melcher Ungern von Post
By Wm Wallace White
ATTY.

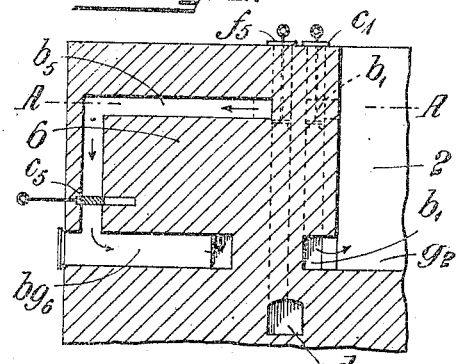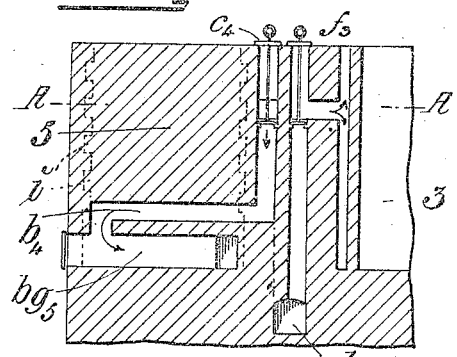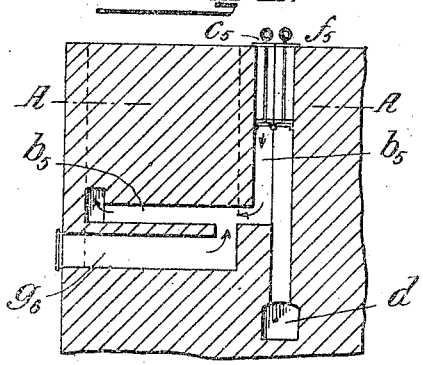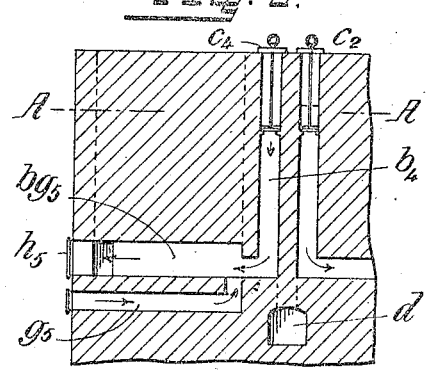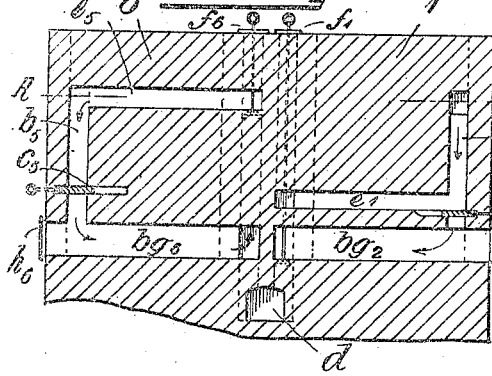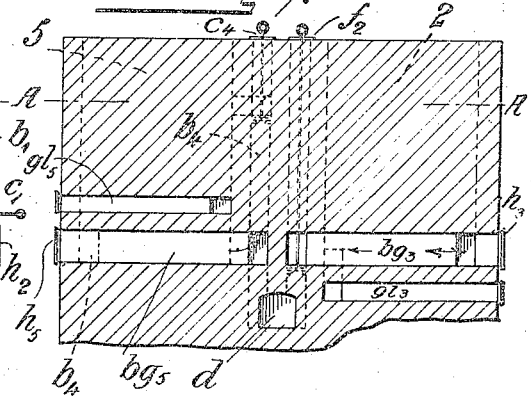

UNITED STATES PATENT OFFICE.

THOM MELCHER UNGERN von POST, OF STÄKET, SWEDEN.

CARBONIZING-FURNACE.

1,375,944.  Specification of Letters Patent.  Patented Apr. 26, 1921.

Application filed October 16, 1919. Serial No. 331,215.

*To all whom it may concern:*

Be it known that I, THOM MELCHER UNGERN VON POST, engineer, subject of the King of Sweden, residing at Stäket, Sweden, have invented certain new and useful Improvements in Carbonizing-Furnaces, of which the following is a specification.

The furnace system in accordance with the present invention, which is intended for continuous distillation or the like of organic matter and other substances, in which heat is transported and utilized from one furnace section to a succeeding one, can be employed both for the direct and the indirect heating of the material to be treated. This system consists of a number of shafts or chambers, arranged in series in two rows and so connected with one another, that gases can be led through a furnace shaft or chamber to the next succeeding shaft or chamber in the series after having traveled past or through a hearth or fire-room lying between adjacent shafts or chambers and which can be shut off from outside, in order finally to be diverted through a closable conduit leading to a flue or smoke outlet arranged between the rows of shafts and common to the entire furnace system.

In the accompanying drawings are shown different forms of the furnace system referred to, consisting of six shafts or chambers, three on either side of the flue.

Figure 1 shows the furnace system with different forms of the shafts or chambers in horizontal section on the line A—A in Figs. 2 and 3. Fig. 2 shows a vertical section on the line B—B in Fig. 1.

Fig. 3 shows a vertical section on the line C—C in Fig. 1.

Fig. 4 shows a part of a horizontal section on the line A—A in Fig. 1 and Fig. 6.

Fig. 5 is a vertical section on the line D—D in Fig. 4.

Fig. 6 is a vertical section on the line E—E in Fig. 4.

Fig. 7 is a horizontal section on the line A—A in Figs. 8 and 9.

Fig. 8 is a vertical section on the line F—F in Fig. 7.

Fig. 9 is a vertical section on the line G—G in Fig. 7.

The designations 1—6 indicate in what order in the series a certain detail is situated; thus for example the designations "shaft 5," "fire-room $g_5$," or "damper $c_5$" refer to the fifth chamber in the series with appertaining fire-room and damper and so on.

If the furnace system is to be used for direct heating, the material is placed directly in the shaft or chamber, see for example 1 and 2 in Fig. 1 and 4 in Fig. 7, in which case the combustion gases are allowed to sweep directly through the material. If, on the other hand, it is to be used for indirect heating, the chamber is provided with retorts, which may be either stationary, as shown for example at 3 and 4 in Fig. 1, or removable, as shown for example at 5 and 6 in said figure and at 5 in Figs. 4 and 7, and which may be of the type disclosed in Letters Patent of the United States No. 889,150, granted to me under date of May 26, 1908, or that shown in my copending application Serial No. 331,214, filed October 16, 1919, in which the heating gases are caused to wash the outer walls of the retorts. In all these cases an outlet for the discharge of distillation products is arranged at the bottom of each chamber or retort.

In Fig. 1 the reference characters, 1 and 2 designate one form of construction, 3 and 4 another, and 5 and 6 a third form of construction of the shaft with its appertaining devices. The chamber 1, by means of the partition wall $a$ is divided into two halves communicating with one another, and the right half of which communicates with the left half of the chamber 2 through the conduit $b_1$ which is provided with the damper $c_1$, whereby it can be closed. The chamber 1 is also in communication with a flue $d$, common to all the chambers, by means of a passage or opening $e_1$ having a damper $f_1$.

In the drawings the conduits $b$ and $e$ are shown with a common escape opening proceeding from each chamber, which however is not necessary, though it entails certain advantages.

Between the chambers 1 and 2, as well as between each pair of adjacent shafts or chambers in the entire system, there is arranged a fire chamber or hearth $g_2$, exteriorly provided with a gas-tight closable opening $h_2$ for the feeding of the fuel or the admission of air. The end of the hearth $g_2$ facing toward the furnace system communicated with the immediately succeeding shaft in the series, that is the shaft 2. either directly or through the part of the conduit $b_1$, situated behind the damper $c_1$, in the direction of the current of gas: The chambers 3 and 4 together with the appertaining hearths $g_3$, $g_4$ are arranged essentially in the same manner, but with the difference that the inlets and outlets in the chambers are provided with stationary retorts almost entirely around which the heating gases sweep. The arrangements for leading off the smoky gases to the flues $d$ are here, as in the other forms shown in the drawing, essentially in conformity with those described with reference to shaft or chamber 1 in Fig. 1.

The chambers 5 and 6, Figs. 1, 2 and 3 are intended for replaceable vertical retorts of cylindrical shape. These shafts or chambers have been given a horizontal cross section in the form of a regular octagon, the dimensions of the retorts being such, that on the retort being lowered into the shaft, its wall will practically touch the sides of the octagon, though with the necessary play. In order to give the heating gases sufficient space to circulate in the retort, a number of layers of brick in the chamber wall have been recessed, as is indicated by the dotted lines $i$ in Figs. 1 and 3. Two different forms of the conduits and flues between the chambers 4 and 5 or 5 and 6, are shown in Fig. 1. In accordance with one of these forms, the conduit $b_4$ after having passed the damper $c_4$, goes vertically downward opposite the hearth $bg_5$, runs above it, parallel with it, and debouches into the front or outer end of the fire arch, see Figs. 1 and 3. In accordance with the other form, as shown in Fig. 2, the conduit $b_5$ runs above the hearth $bg_6$ parallel with it, to the outer wall, whereupon the conduit $b_5$ diverges vertically downward to the front end of the fire arch above which the damper $c_5$ has been placed, which latter here consists of a slidable damper, the operating rod of which passes through the outer wall. Both in the latter and in the former case, the hearth $bg_6$ or $bg_5$ serves as the outermost connecting member for the conduit $b_5$ or $b_4$.

The modification of the furnace system which is shown in Figs. 4, 5 and 6 differs from that shown in Figs. 1, 2 and 3 only in the fact that the shafts or chambers, which in this case also may contain stationary or replaceable retorts, have their inlets or outlets placed diagonally, so that the inlet is situated at the outer wall of the furnace system and the outlet at its inner side. The horizontal part of the conduit $b$, situated behind the damper $c$, is placed between two chambers at right angles to the longitudinal direction of the furnace system in the same way as in the case of the chambers 5 and 6 in Fig. 1. In accordance with Figs. 4 and 5 this conduit part $b_5$ debouches directly into the shaft 6, the hearth $g_6$ being placed under or, if desired, over the horizontal part of the conduit $b_5$ and having its rear or inner end debouching into the said part. In accordance with Figs. 4 and 6 the horizontal part $bg_5$ of the conduit $b_5$ passes through the outer wall and is provided with a closing device $h_5$ a shutter or the like whereby the said branch can serve as a hearth with the flame directed from within outward and the conduit $g_5$ instead of serving as a hearth, is made to serve first as a channel of supply for combustible distillation gases, and afterward as a channel of supply for cooling air, when the retort 5 is cooling, which air, heated by the chamber and the retort 5, is used as combustion air in the succeeding hearth. Similar arrangements and mode of operation apply in all the other forms of the furnace system, the shafts whereof contain retorts, and in which the horizontal part of the conduit $b$ running in the transverse direction of the furnace system, is used as a hearth $bg$, which should be sufficiently clear from the drawing, whence a detailed description thereof is superfluous.

In the forms according to Figs. 7, 8 and 9 the inlet and outlet openings of the chambers as in the case of Figs. 4, 5 and 6, are placed diagonally, though with the difference that the outlets have been placed in the vicinity of the outer wall and the inlets toward the inner side of the furnace system. Fig. 7 and 8 show one and Figs. 4, 5 and 9 another modified form of the conduit $b$ and the hearth or air supply devices. In accordance with the first mentioned form, the conduit $b_5$ or $b_1$ diverges from the shaft 5 or 1 vertically downward at the outer wall of the system, and immediately above the hearth is shut off by the damper $c_5$ or $c_1$, while its horizontal part $bg_6$ or $bg_2$, running in the transverse direction of the furnace system, has its inner end debouching into the chamber 6 or 2 and its outer end passing through the outer wall, where it can be closed by a shutter $h_6$ or $h_2$, thus at the same time serving as a conduit between the chambers 5 and 6 or 1 and 2, and the hearth $bg_6$ or $bg_2$ and the air inlet for the chamber 5 or 2. The escape pipe $e$ for the damper $f$ and the smoke flue $d$ may then either be placed at the top as shown in Fig. 7 and the left side of Fig. 8 or else immediately above the damper $c$ as is shown at the right side of Fig. 8.

In accordance with the form illustrated in Figs. 7 and 9 the conduit $b_4$ or $b_2$ debouches from the outer lower part of the chamber 4 or 2, then runs horizontally in the transverse direction of the furnace, forming the hearth $bg_5$ or $bg_3$ and is in closable connection $h_5$ or $h_3$ with the outer air through the outer wall, and diverges at its inner end vertically upward toward the damper $c_4$ or $c_2$, which has thus been placed behind, instead of, as previously shown in front of the horizontal part of the conduit or the hearth $bg_5$ or $bg_3$, running in the transverse direction, in order finally to debouch at the top behind the damper $e_4$ or $e_2$ into the chamber 5 or 3. The connection with the flue has here been effected by the ramification downward of the pipe $e_4$ or $e_2$ at the inner end of the horizontal part $bg$ of the conduit, as is evident from Figs. 7 and 9. In order to permit of the admission of air, for example to the chamber 5, for the purpose of cooling its contents, and at the same time to enable the chamber 4 to be placed in connection with the smoke flue $d$, an outwardly closable air conduit $gl_5$ or $gl_3$ must be arranged, which may then be placed above or below the hearth.

From the foregoing it will be seen that in the operation of the furnace the gases are led from one furnace shaft or chamber either past or through a hearth depending upon whether or not the damper to said hearth is closed, and then into the next succeeding shaft or chamber, and after such gases have so passed through all of the chambers in the series they are then diverted through a closable conduit which leads them off to the flue or smoke outlet which is arranged between the rows of shafts and is common to the entire furnace system.

By means of the above described devices there is obtained a furnace system, easily constructed and easily operated besides having the advantages of low working costs and large output capacity.

A special advantage is afforded in the fact that the furnace system under consideration can be added to and enlarged with further shafts or chambers without any appreciable interruption in the continuity of the process.

Having thus described my invention, I declare, that what I claim is:

1. A carbonizing furnace, comprising a plurality of retort chambers arranged in series in two rows, a smoke flue between said rows, each of said chambers communicating by means of a damper-controlled conduit with said smoke flue and with the immediately succeeding chamber, a hearth conduit for each chamber, one located between each pair of adjacent chambers, and closable from without, said chambers being also in communication with their respective hearth conduits.

2. A carbonizing furnace, comprising a plurality of retort chambers arranged in series in two rows, a smoke flue between said rows, each of said chambers communicating by means of a damper-controlled conduit with said smoke flue and with the immediately succeeding chamber, a hearth conduit for each chamber, one located between each pair of adjacent chambers, and closable from without, said chambers being also in communication with their respective hearth conduits, said hearth conduits also communicating with said damper-controlled conduit of the chambers, whereby the hearth conduits and connecting conduits are provided with a common inlet to the respective chambers.

3. A carbonizing furnace, comprising a plurality of retort chambers arranged in series in two rows, a smoke flue between said rows, each of said chambers communicating by means of a damper-controlled conduit with said smoke flue and with the immediately succeeding chamber, a hearth conduit for each chamber, one located between each pair of adjacent chambers, and closable from without, said chambers being also in communication with their respective hearth conduits, a branch of the conduits located behind the damper looking in the direction of the current of gas serving as a common inlet for the hearth conduits and damper-controlled conduits to the next succeeding chamber.

4. A carbonizing furnace, comprising a plurality of retort chambers arranged in series in two rows, a smoke flue between said rows, each of said chambers communicating by means of a damper-controlled conduit with said smoke flue and with the immediately succeeding chamber, a hearth conduit for each chamber, one located between each pair of adjacent chambers, and closable from without, said chambers being also in communication with their respective hearth conduits, the inner end of the hearth conduits communicating with the damper-controlled conduits behind the damper, the outlet to the next chamber being so located that a part of the damper-controlled conduits constitutes the hearth conduits.

In witness whereof I have hereunto set my hand in presence of two witnesses.

THOM MELCHER UNGERN von POST.

Witnesses:
 AUG. HAGELIN,
 PER JOHANSSON.